(12) United States Patent  (10) Patent No.: US 7,796,824 B2
Ishiwata  (45) Date of Patent: Sep. 14, 2010

(54) VIDEO CODING DEVICE, VIDEO DECODING DEVICE AND VIDEO ENCODING METHOD

(75) Inventor: Shunichi Ishiwata, Urayasu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 931 days.

(21) Appl. No.: 11/616,177

(22) Filed: Dec. 26, 2006

(65) Prior Publication Data

US 2007/0147690 A1    Jun. 28, 2007

(30) Foreign Application Priority Data

Dec. 27, 2005    (JP)    ............................... 2005-375930

(51) Int. Cl.
G06K 9/36    (2006.01)
G06K 9/00    (2006.01)
(52) U.S. Cl. ...................... 382/232; 382/103
(58) Field of Classification Search ......... 382/232–253, 382/305, 103, 199, 203, 282–283, 173; 375/240.01–240.27; 348/586–589
See application file for complete search history.

(56) References Cited

U.S. PATENT DOCUMENTS 5,568,167 A * 10/1996 Galbi et al. ................. 348/589
6,580,756 B1 * 6/2003 Matsui et al. .......... 375/240.08
6,625,316 B1 * 9/2003 Maeda ....................... 382/203
6,683,992 B2 * 1/2004 Takahashi et al. ........... 382/243
6,785,429 B1 * 8/2004 Senoh ........................ 382/305

OTHER PUBLICATIONS

Peter Pirsch, et al., "VLSI Architectures for Video Compression—A Survey", Proceedings of the IEEE, Feb. 1995, vol. 83, No. 2, pp. 220-246.
Po-chih Tseng, et al., "Advances in Hardware Architectures for Image and Video Coding—A Survey", Proceedings of the IEEE, Jan. 2005, vol. 93, No. 1, pp. 184-197.

* cited by examiner

Primary Examiner—Sherali Ishrat
(74) Attorney, Agent, or Firm—Oblon, Spivak, McClelland, Maier & Neustadt, L.L.P.

(57) ABSTRACT

A video coding device includes: a detecting unit configured to detect a foreground region, a background image and a shadow region reflected on the background image by the foreground region in an input picture; a shadow information compressing unit configured to perform a compression process to compress the information quantity of the shadow region; and a coding unit configured to code the foreground region, the background image and the information on the shadow region subjected to the compression process.

18 Claims, 9 Drawing Sheets

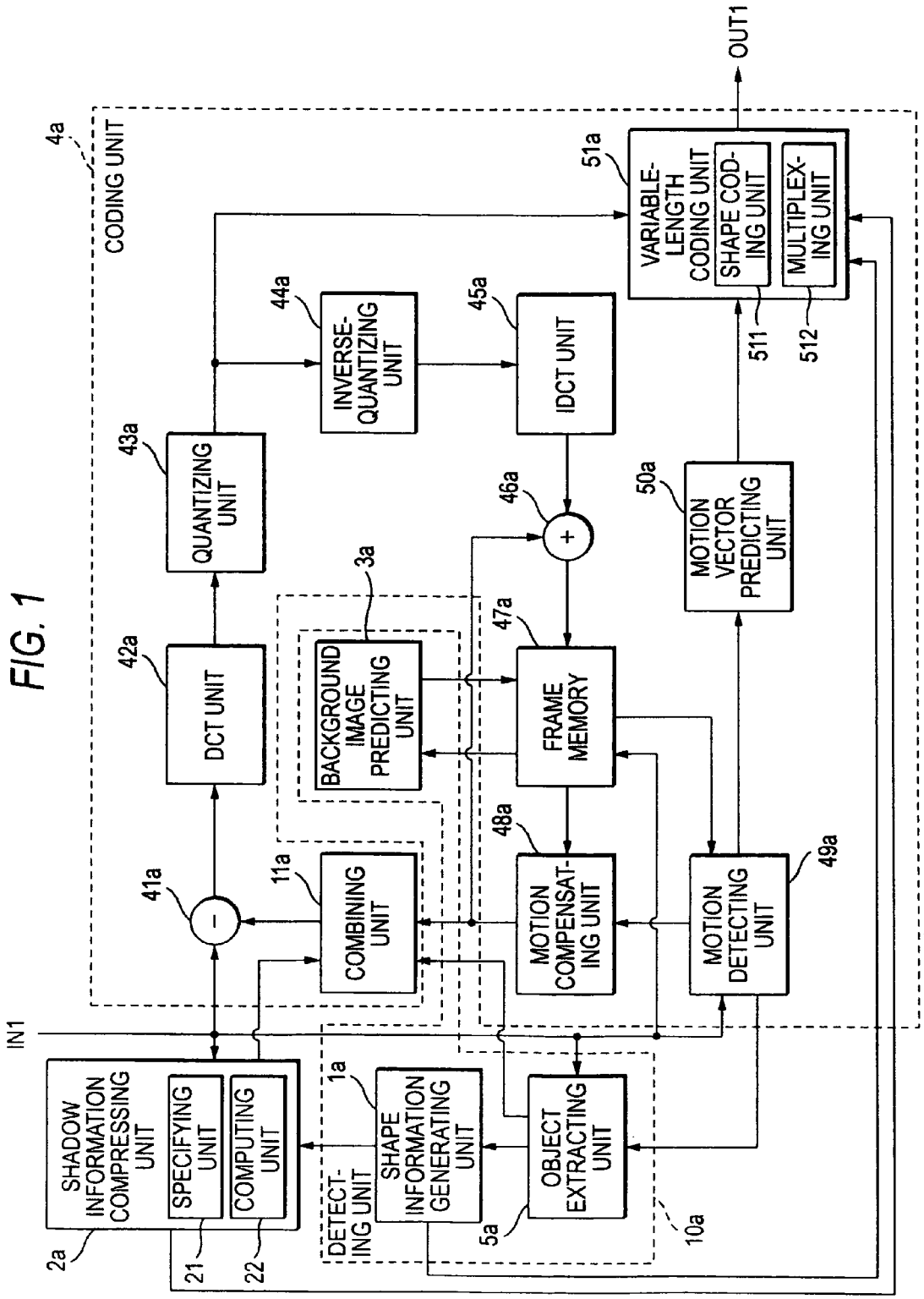

VIDEO CODING DEVICE, VIDEO DECODING DEVICE AND VIDEO ENCODING METHOD

CROSS-REFERENCE TO RELATED APPLICATIONS

This application is based upon and claims the benefit of priority from Japanese Patent Application No. 2005-375930, filed on Dec. 27, 2005, the entire contents of which are incorporated herein by reference.

BACKGROUND

1. Field

The invention relates to a video coding technique, and more particularly to a video coding device, a video decoding device and a video coding method which are applicable to an image coding system employing interframe prediction such as the MPEG (Moving Picture Experts Group) system.

2. Description of the Related Art

In a video coding technique such as the MPEG system, orthogonal transform such as DCT (Discrete Cosine Transform) is employed for reduction of spatial information quantity and motion compensation (MC) is employed for reduction of time information. General MC is performed by coding the frame prediction using a motion vector, i.e. a difference (predictive residual) between a present picture and a predicted picture (for example, Peter Pirsch, "VLSI architectures for Video Compression-A Survey", PROCEEDINGS OF THE IEEE (USA), IEEE, February 1995, Vol. 83. No. 2, p. 220-246). Therefore, as the predictive residual increases, the quantity of codes such as a DCT coefficient increases, thus reducing the coding efficiency. Further, in MPEG 4, a shape coding technique is adopted which recognizes objects in the picture and codes the shape information of each of the objects (for example, Po-chih Tseng et al, "Advances in Hardware Architectures for Image and Video Coding-A Survey", PROCEEDINGS OF THE IEEE, (USA), IEEE, January 2005, Vol. 93, No. 1, p. 184-197). In MPEG 4, the object and background constituting one scene are separated and different coding processes can be performed for the foreground and background. For the background, only the pattern (pixel value) indicative of the luminance and chrominance is coded like MPEG 2, whereas for the foreground, the shape information as well as the pattern information is coded.

However, according to a region of a foreground object (hereinafter referred to as a foreground region) moving on the background image in a video, a shadow region corresponding to the foreground region also moves on the background image. As a result, the predictive residual increases between the region on which the shadow region is newly reflected and the region on which the shadow region has not been reflected. Thus, owing to an increase in the predictive residual, the coding efficiency of the video is reduced. Not only where the foreground region and shadow region move in parallel, but also where the foreground region approaches the background image or a camera position is shifted, the coding efficiency of the video is reduced.

SUMMARY

In accordance with a first aspect of the invention, a video coding device includes: a detecting unit configured to detect a foreground region, a background image and a shadow region reflected on the background image by the foreground region in an input picture; a shadow information compressing unit configured to perform a compression process to compress the information quantity of the shadow region; and a coding unit configured to code the foreground region, the background image and the information on the shadow region subjected to the compression process.

In accordance with a second aspect of the invention, a video decoding device includes: a decoding unit configured to receive a coded bit stream including a picture containing a foreground region, a background image and a shadow region reflected on the background image by the foreground region, and to decode the background image, shape information of the foreground region, information of the relative positional relationship between the foreground region and the shadow region, and luminance variation information indicating a luminance of luminance variation of the shadow region relative to the background image; and a restoring unit configured to restore shape information of the shadow region from the shape information of the foreground region and the information of the relative positional relationship, and restore pattern information of the shadow region from the background image and the luminance variation information.

In accordance with a third aspect of the invention, a video coding method includes: detecting a foreground region, a background image and a shadow region reflected on the background image by the foreground region in an input picture; performing compression process to compress the information quantity of the shadow region; and coding the foreground region, the background image and the information of the shadow region on the shadow region subjected to the compression process.

BRIEF DESCRIPTION OF THE DRAWINGS

FIG. 1 is a block diagram showing an exemplary arrangement of a video coding device according to a first embodiment of the invention;

DETAILED DESCRIPTION

Now refereeing to the drawings, an explanation will be given of first to third embodiments of the invention. In the figures directed to the following first to third embodiments, the same or similar symbols refer to the same or similar elements.

First Embodiment

As shown in FIG. 1, the video coding device according to the first embodiment of the invention is configured to code a video containing a series of input pictures IN1. The video coding device includes a detecting unit 10a, a shadow information compressing unit 2a, and a coding unit 4a. The detecting unit 10a detects a foreground region, a background image and a shadow region reflected on the background image by the foreground region in each of the input pictures IN1. The shadow information compressing unit 2a performs compression process for compressing the information quantity of the shadow region. The coding unit 4a codes information on the foreground region, the background image and the shadow region subjected to the compression process. Now, the "foreground region" means a region of the object which is a target to be picked up in the input picture IN1. The "background image" means the image of the background defined by a region except the foreground region and the shadow region in the input picture IN1. The "shadow region" is a region of the shadow projected on the background image when illumination light is cut off by the foreground region in the input picture IN1.

Figure 2A:
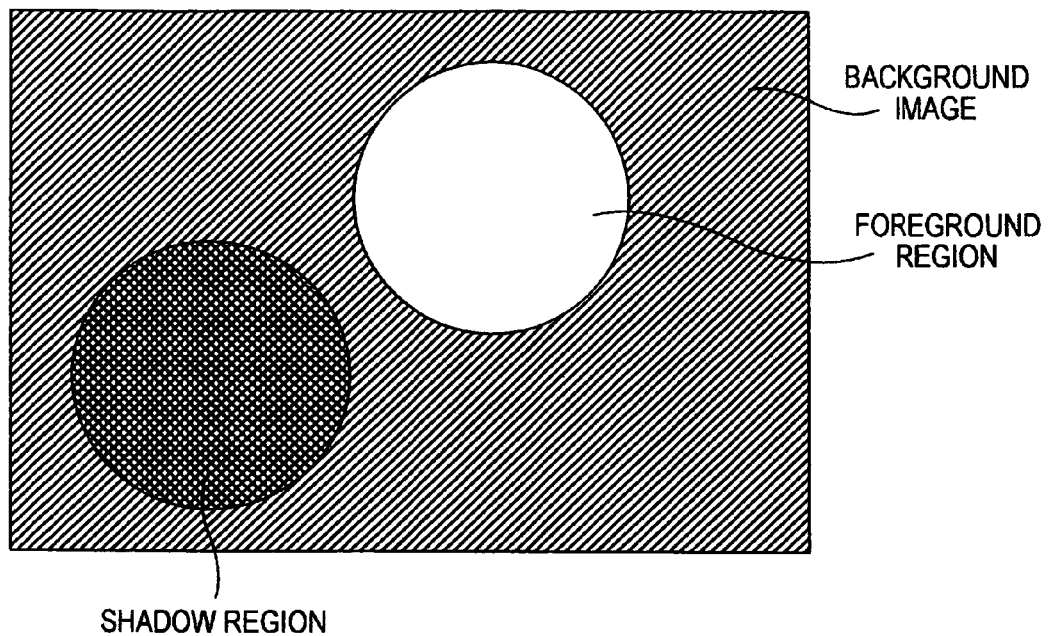
FIG. 2A is a schematic view for explaining the picture (frame) coded by the video coding device according to the first embodiment of the invention.
Figure 2B:
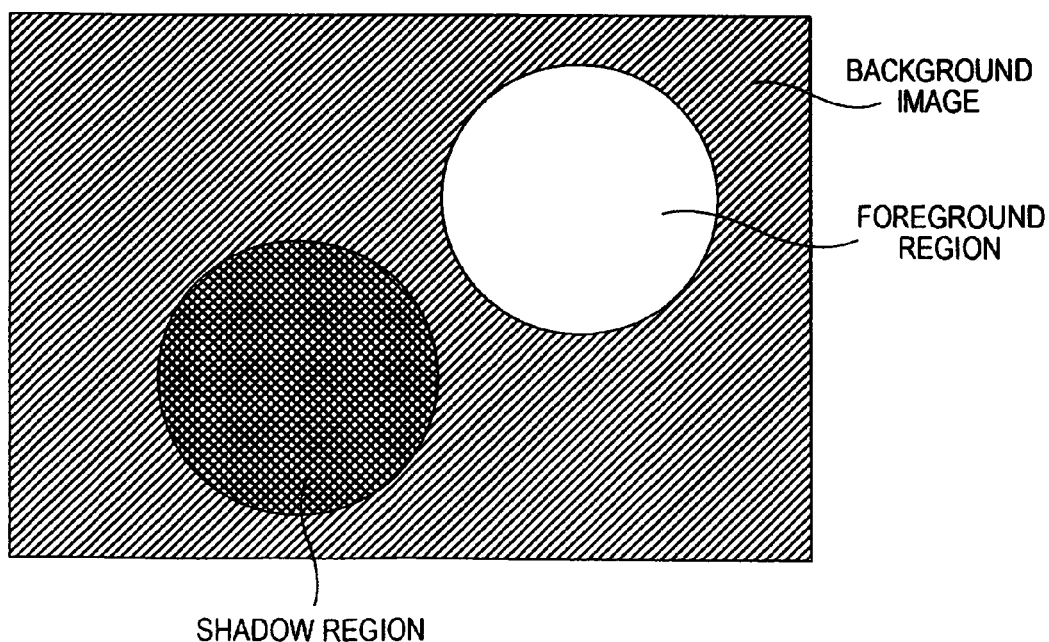
FIG. 2B is a schematic view of the picture (frame) after the picture shown in FIG. 2A in time passage.

As shown in FIGS. 2A and 2B, the shadow region moves according to motion of the foreground region. FIG. 2A shows "frame 1," and FIG. 2B shows "frame 2" after the "frame 1" in time passage. It is assumed that the illumination light is applied from upper right in the figure. Generally, the shadow region has the similar shape to the foreground region and a pattern with luminance lowered from that of the background image. The shadow information compressing unit 2a performs the compressing process using the fact that the shadow region has the similar shape as the foreground region and a pattern with luminance lowered from that of the background image.

The detecting unit 10a includes a background image predicting unit 3a, a shape information generating unit 1a and an object extracting unit 5a. The background image predicting unit 3a predicts the background image of the input picture IN1. The object extracting unit 5a extracts the object in the input picture IN1, i.e. the foreground region and shadow region on the basis of the background image predicted by the background image predicting unit 3a. The shape information generating unit 1a generates the shape information of the foreground region and shadow region. The "shape information" represents the shape of the object, and for example, contains 1 bit data for one pixel. The operation of each of the background image predicting unit 3a, shape information unit 1a and object extracting unit 5a will be explained later in detail.

The shadow information compressing unit 2a includes a specifying unit 21 configured to specify a relative positional relationship between the foreground region and the shadow region on the basis of the information generated by the shape information generating unit 1a and a computing unit 22 configured to compute luminance variation information indicating a luminance variation of the shadow region relative to the background image, such a decreasing rate or amount of luminance of the shadow region relative to the background image. The decreasing rate is used as the luminance variation information for describing the embodiments. As a result, the information of the shadow region can be obtained with high accuracy. The information of the relative positional relationship and decreasing rate of luminance is coded by the coding unit 4a. The relative positional relationship specified by the specifying unit 21 may contain information of a magnifying or reducing rate, center of rotation, rotating angle and rotating direction, etc.

Further, by coding the shape information of the foreground region and relative positional relationship, on the side of decoding, the shape information of the shadow region can be acquired from the shape information of the foreground region. Further, by coding the background image and information of the decreasing rate of luminance, on the side of decoding, the pattern information of the shadow region can be acquired. Thus, the quantity of codes about the shadow region can be greatly reduced.

The coding unit 4a has an arrangement relied on the video coding system using a shape coding technique, e.g. MPEG4. Concretely, the coding unit 4a includes a combining unit 11a, a subtracter 41a, a discrete cosine transform (DCT) unit 42a, a quantizing unit 43a, an inverse-quantizing unit 44a, an inverse discrete cosine transform (IDCT) unit 45a, an adder 46a, a frame memory 47a, a motion compensating unit 48a, a motion detecting unit 49a, a motion vector predicting unit 50a, and a variable length coding unit 51a. The variable length coding unit 51a includes a shape coding unit 511 and a multiplexing unit 512.

The input picture IN1 input to the coding unit 4a is divided into plural blocks which are supplied to the subtracter 41a in the order of block positions. In the embodiments, the "block" means a macro block which is a square region of e.g. 16×16 pixels, or a sub-macro block when the macro block is further divided.

The combining unit 11a combines the information on the background image predicted by the background image predicting unit 3a, information on the foreground region extracted by the object extracting unit 5a and information on the shadow region generated by the shadow information compressing unit 2a. The picture acquired through the combining process by the combining unit 11a provides a predicted picture. A difference value (predictive residual) between the predicted picture and input picture IN1 is computed by the subtracter 41a.

The DCT transform unit 42a transforms the difference value into a DCT coefficient which is in turn supplied to the quantizing unit 43a. The quantizing unit 43a quantizes the DCT coefficient to produce a transform coefficient. The transform coefficient acquired from quantization by the quantizing unit 43a is coded in a variable-length in the variable length coding unit 51a and also supplied to the inverse quantizing unit 44a.

The transform coefficient supplied to the inverse quantizing unit 44a is inverse-quantized and thereafter inverse-transformed by the IDCT unit 45a. The resultant coefficient is added to the predicted picture supplied from the motion compensating unit 48 in the adder 46. The resultant picture is produced as a local-decoded picture which is supplied to the motion compensating unit 48a again. The motion compensating unit 48a supplies the motion-compensated picture to the combining unit 11a according to the shape information. Further, in order to reduce the quantity of codes for the motion vector, the motion vector predicting unit 50a computes a difference vector between motion vectors of the respective blocks.

The shape coding unit 511 codes the shape information and supplies the coded shape information to the multiplexing unit 512. Incidentally, the shape coding unit 511 has a function of supplying the information such as the scaling factor of the shape information to the multiplexing unit 512 at the time of coding the shape information. The multiplexing unit 512 multiplexes the shape information coded by the shape coding unit 511, transform coefficient coded output from the quantizing unit 43a, and the information such as the difference vector output from the motion vector predicting unit 50a, thereby producing a coded bit stream OUT1.

In this way, since the shadow information compressing unit 2a generates the information on the shadow region with high accuracy, the predicted picture can be also generated with high accuracy. As a result, the predictive residual which is a difference between the input picture IN1 and the predicted picture can be reduced.

Figure 3:
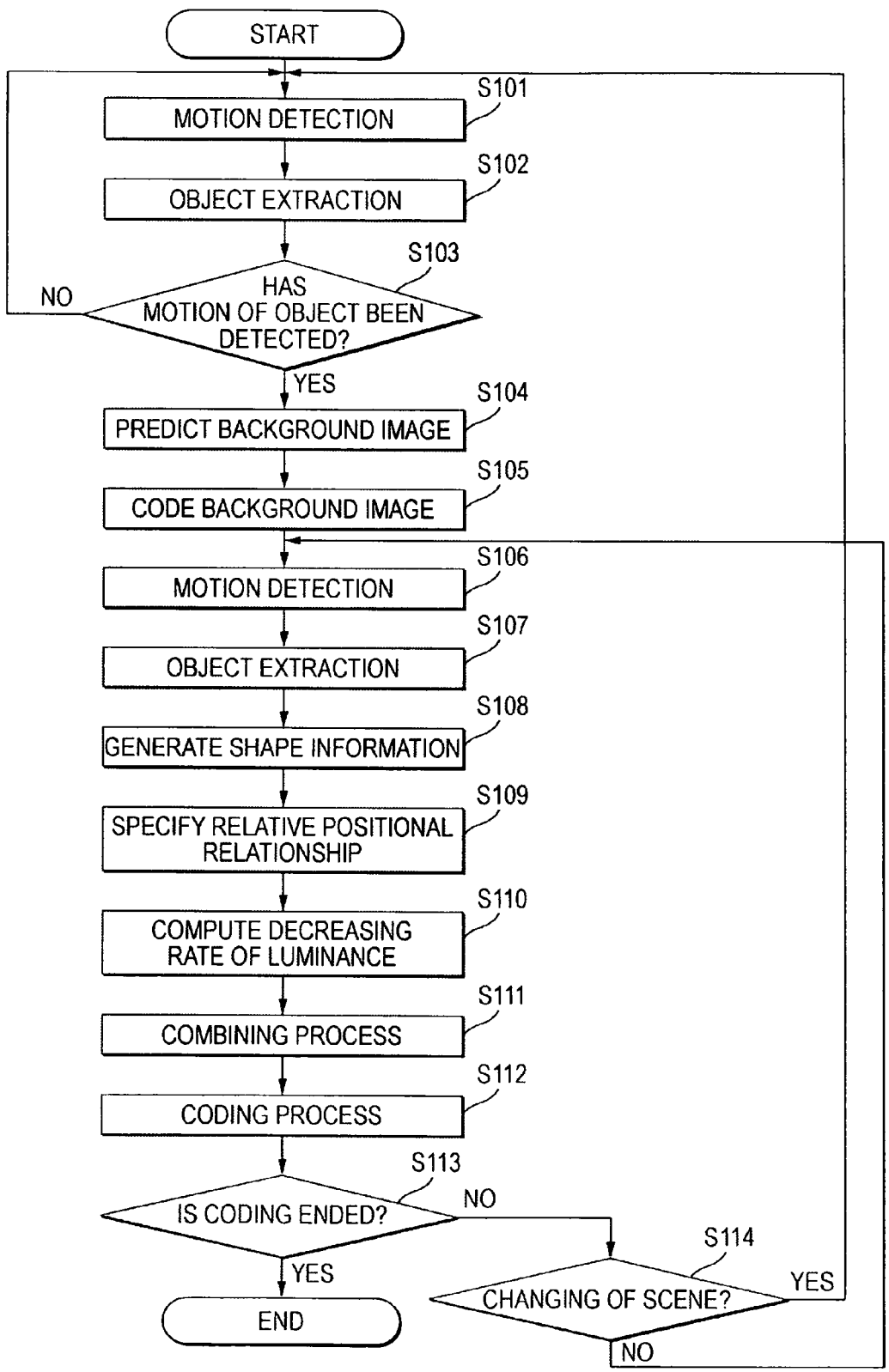
FIG. 3 is a flowchart showing an exemplary operation of the video coding device according to the first embodiment of the invention.

Next, referring to the flowchart shown in FIG. 3, an explanation will be given of the operation of the video coding device shown in FIG. 1. Incidentally, it is assumed that each of the series of input pictures IN1 (one scene) has the same background image. The brief outline of the process performed by the video coding device is as follows: (1) process of predicting the background image (steps S101 to S104);

(2) process of coding the background image (step S105);

(3) process of generating the shape information (steps S106 to S108);

(4) process of performing compression process for compressing the information quantity of the shadow region (steps S109, S110);

(5) process of combining the information on the background image, foreground region and shadow region (step S111); and (6) process of coding the predictive residual and information on the shadow region subjected to the compression process (step S112).

Figure 4A:
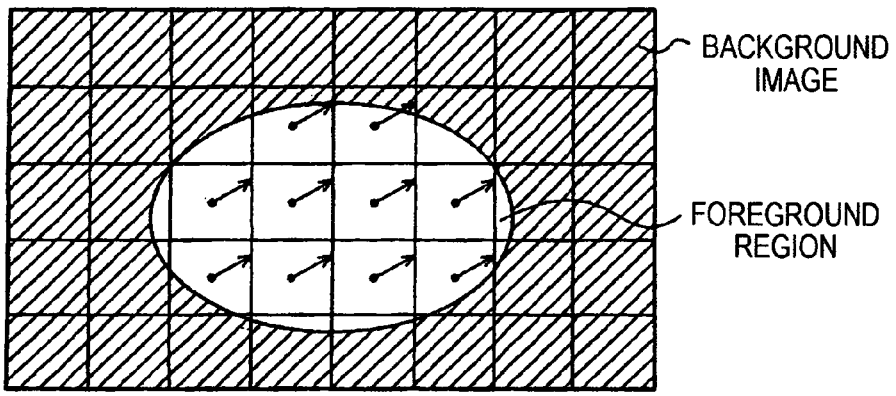
FIGS. 4A to 4C are schematic views for explaining the operation of the video coding device according to the first embodiment of the invention.
Figure 5:
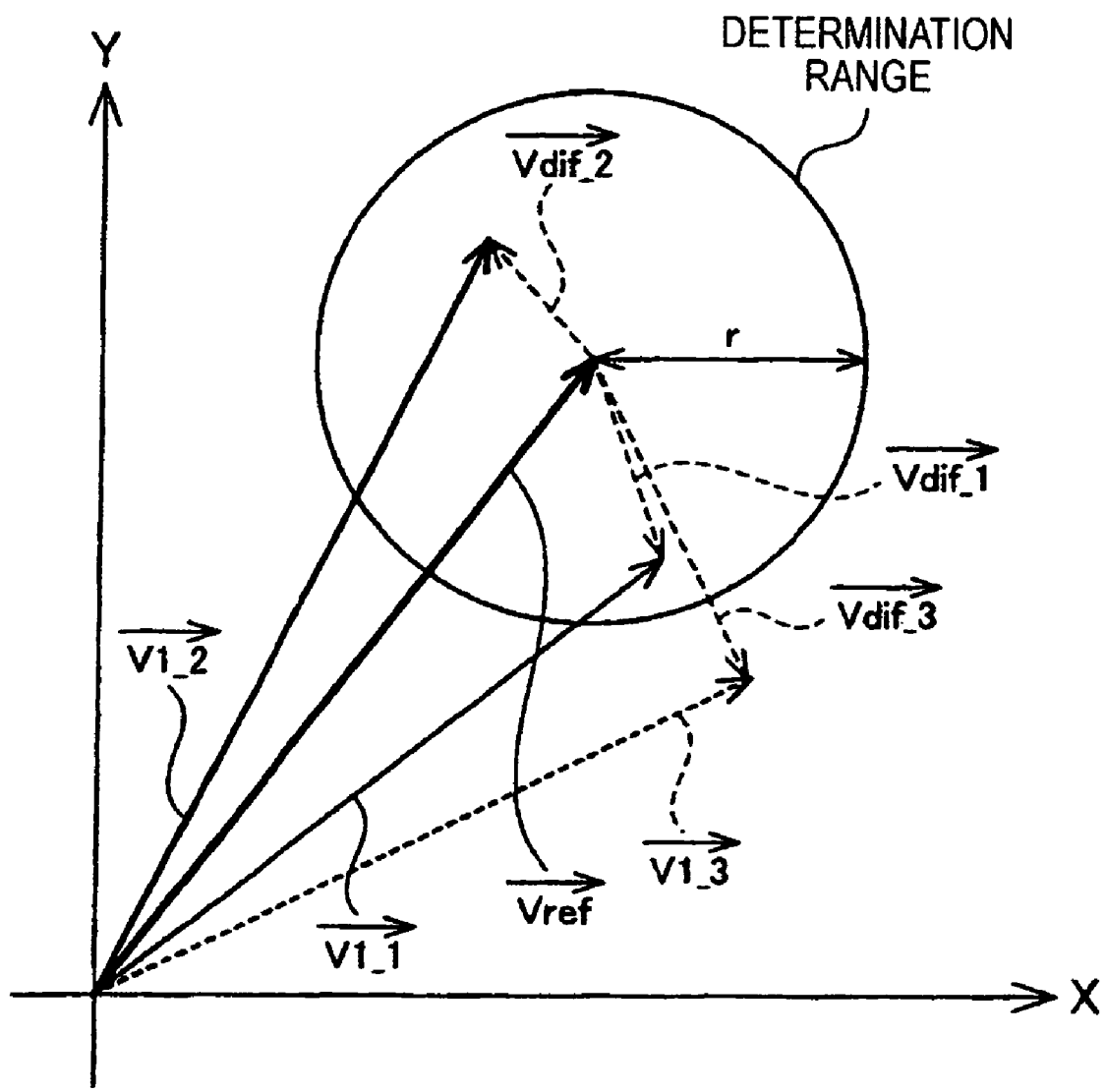
FIG. 5 is a schematic view for explaining the operation of the object extracting unit according to the first embodiment of the invention.

First, in step S101, as shown in FIG. 4A, the motion detecting unit 49a makes the motion detection for each block referring to the pictures previously stored in the frame memory 47a. Further, the motion detecting unit 49a takes a plurality of blocks with similar motion vectors as one group, and averages the motion vectors of the respective blocks within the group, thereby computing the motion vector of each group. For example, as shown in FIG. 5, the motion vector of a certain block is taken as a reference vector Vref, difference vectors Vdif_1, Vdif_2 and Vdif_3 between the reference vector Vref and motion vectors V1_1, V1_2 and V1_3 for comparison are computed. It is determined whether or not each difference vector Vdif_1, Vdif_2, Vdif_3 is within a determination range. The motion vectors having the difference vectors residing in the determination range, i.e., motion vectors V1_1 and V1_2, are grouped and averaged.

In step S102, the object extracting unit 5a generates a predicted picture based on the motion vector of each group obtained in step S101, and computes the difference value between the generated predicted picture and the input picture IN1 for each pixel. The object extracting unit 5a compares the computed difference value and a threshold value. If there is a boundary between the foreground region and the background image within the block and the motion differs between the foreground region and the background image, of the foreground region and the background image, the region using an appropriate motion vector provides a smaller difference value whereas the region not using the appropriate motion vector provides a larger difference value. Thus, by classifying the regions into the regions providing the difference value for each pixel smaller and larger than the threshold value, thereby detecting the shape of the object. Incidentally, if the background image and the foreground region make the same motion, the object cannot be extracted by this method. However, this is not problematic. This is because since the predictive residual is essentially very small, even if this method is not adopted, the efficiency of coding is high.

In step S103, the object extracting unit 5a detects the motion of the object on the basis of the shape of the object detected in step S102. If the motion of the object is detected, the process proceeds to step S104. If the motion of the object is not detected, the process returns to step S101.

Figure 4B:
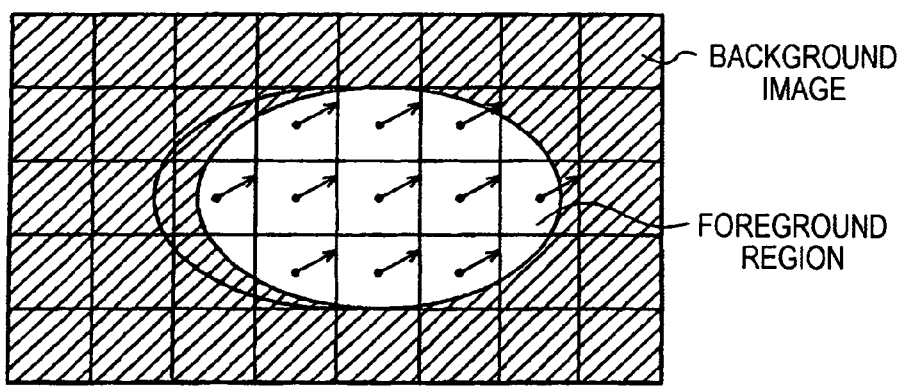
Figure 4C:
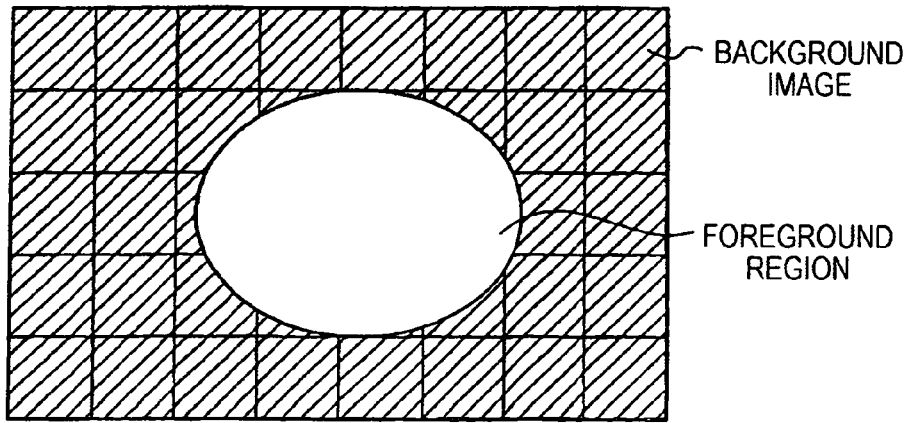

In step S104, the background image predicting unit 3a tracks the motion of the object and predicts that the region having an unchanged pattern (changing degree of the pattern is a predetermined degree and below) of the object is the foreground region and that the region having a pattern appearing or disappearing depending on pictures is the background image. Further, if there is a region having a changing pattern (changing degree of the pattern is higher the predetermined degree) of the object and encircled by the background, this region is assumed as the shadow region. The decreasing rate of luminance of the shadow region is computed on the basis of change of the pixel value of the region appearing or disappearing depending on pictures by the motion of the assumed shadow region. By dividing the pixel value of the shadow region by the decreasing rate of luminance, the pixel value of the background image is acquired. If the difference value between the acquired pixel value and the pixel value of the region appearing or disappearing is not smaller than the threshold value, it is determined that the region assumed as the shadow region is not the shadow region and the pattern of the foreground region is changing. Further, the background image predicting unit 3a predicts the portion hidden by the foreground region on the basis of the pixels of the background image in each input picture IN1 and combines the pixels thus obtained and the essential pixels of the background image, thereby providing the background image. For example, in case that the foreground region in a frame "frame 1" shown in FIG. 4A moves as illustrated in FIG. 4B showing a frame "frame 2" after the "frame 1" in time passage, the background image as shown in FIG. 4C can be obtained by superposing the background image newly appeared in FIG. 4B on the background image in "frame 1". Incidentally, as shown in FIG. 4C, as the case may be, a region remains where the pattern of the background image is not detected. This means that this region has not appeared in the input pictures IN1 hitherto input. Therefore, this region is not referred to at a time of coding the input picture IN1 and may be given an arbitrary value. However, since the difference value in the pixel from the foreground region must be large in the later process, this region is embedded with an appropriate color assuring this.

In step S105, the coding unit 4a codes the background image acquired in step S104 and outputs the coded result as a coded bit stream OUT1. For example, an intraframe coding may be applied to the coding technique.

In step S106, the motion detecting unit 49a performs the motion detection in units of the blocks of the input picture IN1 with reference to the background image acquired in step S104. The detail of the process in step S106 is the same as step S101.

In step S107, the object extracting unit 5a extracts the foreground region and shadow region on the basis of the result of the motion detection in step S106. The detail of the process in step S107 is the same as step S102.

In step S108, the shape information generating unit 1a generates the shape information of the foreground region and shadow region. Concretely, the shape information generating unit 1a assumes that the block with a large predictive residual includes a part or all of the foreground region or the shadow region. The shape information generating unit 1a the difference between the background image and the input picture IN1 is computed in units of pixels. The shape information generating unit 1a takes the region including the difference larger than the threshold value as the pixels of the foreground region and shadow region, thereby generating the shape information of the foreground region and shadow region. The object is discriminated from the shadow region on the basis of the previously predicted result, e.g. the result in step S104.

In step S109, the specifying unit 21 performs the matching between the shape information of the foreground region and the shape information of the shadow region, thereby specifying the relative positional relationship between the foreground region and the shadow region. The same process as the motion detection is performed between the shape information of the shadow region and the shape information of the shadow region to compute the position which gives a minimum sum of absolute differences (SAD), thereby specifying the relative positional relationship between the object and its shadow region. When the sum is larger than a predetermined threshold value (i.e., when the degree of similarity at the matching process is a predetermined degree and below), it is determined that they are not in a relationship of parallel shift. The sum of absolute differences is computed using the bit map resulting from modifying (at least one of magnifying, reducing and rotating) the shape information of the object (one of the shape information of the foreground region and the shape information of the shadow region). On the basis of the case providing the minimum sum (i.e., the matching process is again performed using the modified shape information and based on the modified shape information having the highest degree of similarity), the specifying unit 21 specifies the position, magnifying or reducing rate, center of rotation, rotating angle and rotating direction, etc.

In step S110, the computing unit 22 computes the decreasing rate of luminance of the shadow region relative to the background image. Incidentally, the decreasing rate of luminance may be the result acquired in step S104. Further, the process of step S110 may be performed before or simultaneously with the process of step S109.

In step S111, the combining unit 11a combines the information of the background image acquired in step S104, information of the foreground region and information of the shadow region acquired in steps S109 and S110. The picture acquired by the combining process is supplied as the predicted picture to the subtracter 41a so that the difference (predictive residual) from the input picture IN1 is computed.

In step S112, the DCT unit 42a, quantizing unit 43a and variable-length coding unit 51a of the coding unit 4a code the predicted residual computed in step S111. The information of the relative positional relationship acquired in step S109 and the information of the decreasing rate of luminance acquired in step S110 are coded by the variable-length coding unit 51a. The shape information of the foreground region acquired in step S108 is coded by the shape coding unit 511. The various kinds of information thus coded are multiplexed by the multiplexing unit 512. The multiplexing result is produced as the coded bit stream OUT1. Incidentally, since the background image also gradually changes with time passage, it is preferable that the difference pictures according to the changes are coded.

In step S113, it is determined whether or not the coding process should be ended. If it is determined that the coding process of the input picture IN1 is ended, the coding process is ended. If it is determined that the coding process is not ended, the process step proceeds to step S114.

In step S114, a scene change in the input picture IN1 is detected. If the scene change is detected, the process returns to step S101. If the scene change is not detected, the process returns to step S106.

In this way, as regards the foreground region, its shape information and pattern information are specified. As regards the shadow region, using the correlation between the shadow region and the foreground region, the information of the relative positional relationship and decreasing rate of luminance described above is generated. By using these items of information in order to generate the predicted picture, the predicted picture with high accuracy can be obtained. Thus, the predictive residual can be reduced. As described hitherto in detail, in accordance with the first embodiment of the invention, the increase in the quantity of codes due to the shadow region can be suppressed, thereby improving the efficiency of coding.

Second Embodiment

Figure 6:
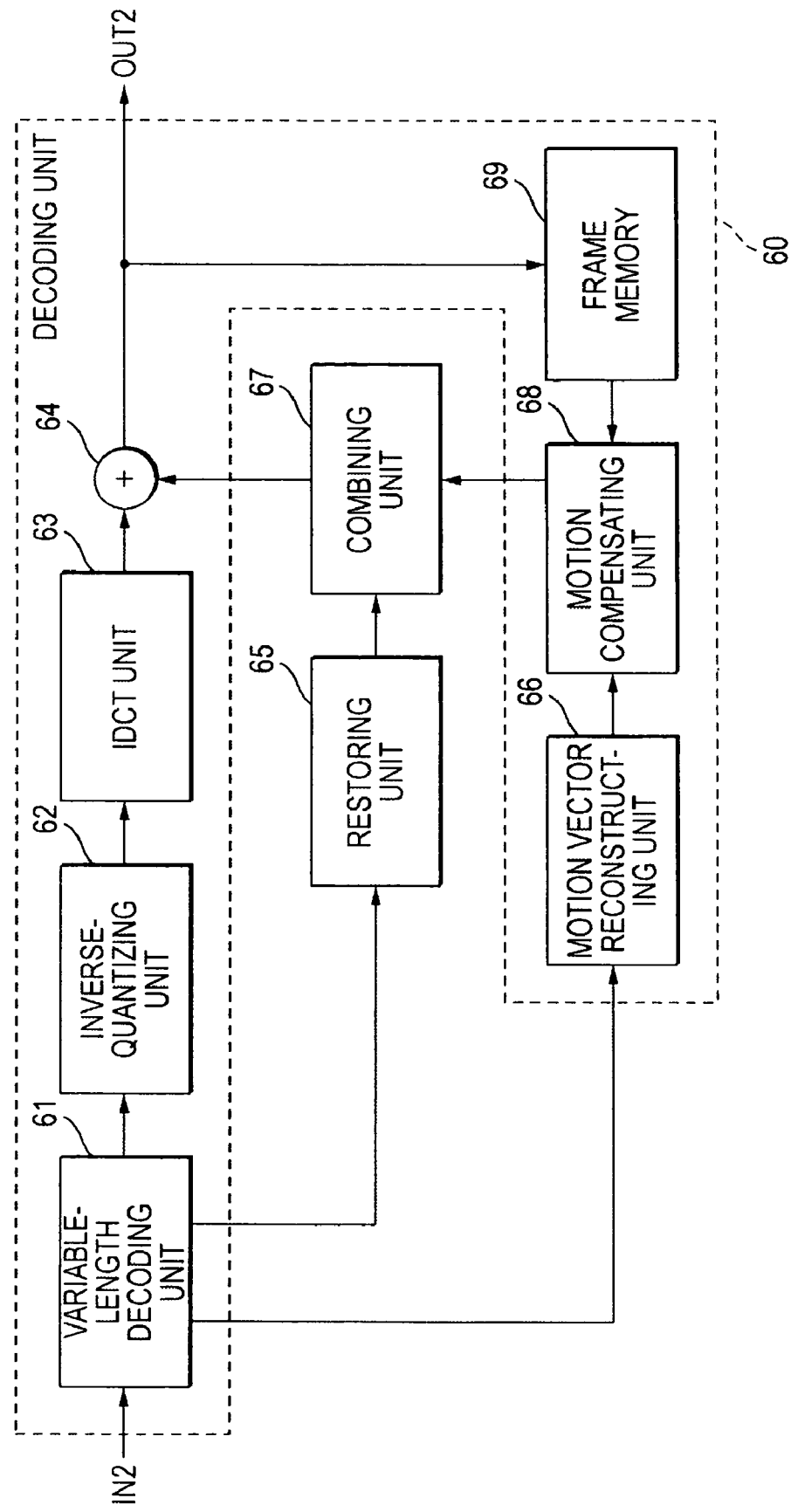
FIG. 6 is a block diagram showing an exemplary arrangement of the video decoding device according to the second embodiment of the invention.

In the second embodiment of the invention, an explanation will be given of a video decoding device capable of decoding the video coded by the video coding device shown in FIG. 1. As shown in FIG. 6, the video decoding device according to the second embodiment is configured to decode a video from a coded bit stream IN2 as an input. The coded bit stream IN2 includes coded pictures each containing a foreground region, a background image and a shadow region reflected on the background image by the foreground region. The video decoding device includes a decoding unit 60, a restoring unit 65, and combining unit 67. The decoding unit 60 decodes, from the coded bit stream IN2, the background image, shape information of the foreground region, information of the relative positional relationship between the foreground region and the shadow region, and information of the decreasing rate of luminance of the shadow region relative to the background image. The restoring unit 65 restores the shape information of the shadow region from the shape information and information of the relative positional relationship, and restores pattern information of the shadow region from the background image and information of the decreasing rate of luminance. Further, the restoring unit 65 restores the shape information of the foreground region. The combining unit 67 combines the decoded background image and the restored foreground region and shadow region.

The decoding unit 60 has an arrangement relied on the video coding system using a shape coding technique, e.g. MPEG4. Concretely, the decoding unit 60 includes a variable-length decoding unit 61, an inverse-quantizing unit 62, an IDCT unit 63, an adder 64, a motion vector reconstructing unit 66, a motion compensating unit 68 and a frame memory 69. The variable length decoding unit 61 has a separating unit and shape decoding unit (not shown).

In the coded bit stream IN2 input to the video decoding device, various kinds of information such as the pattern information and motion vector are multiplexed in addition to the above shape information of the foreground region, information of the relative positional relationship and information of the decreasing rate of luminance.

From the coded bit stream IN2, the separating unit of the variable length decoding unit 61 separates the shape information of the foreground region to be transmitted to the shape decoding unit of the variable length decoding unit 62, separates the information of the relative positional relationship and the information of the decreasing rate of luminance to be transmitted to the restoring unit 65; and separates the information of the motion vector to be transmitted to the motion vector reconstructing unit 66. The shape information of the foreground region decoded by the shape decoding unit of the variable length decoding unit 62 is transmitted to the restoring unit 65.

The variable-length decoding unit 61 decodes the coded data of e.g. the background image. The inverse-quantizing unit 62 inverse-quantizes the decoded data into the initial DCT coefficient. IDCT unit 63 inverse-orthogonal converts the DCT coefficient into the predicted picture according to the shape information.

The motion vector reconstructing unit 66 restructures the motion vector for each block from the information of the motion vector transmitted as the difference vector. The motion compensating unit 68 clips the foreground region from the reproduced image OUT2 produced from the adder 64 according to the shape information of the foreground region, and stores the clipped foreground region in the frame memory 69. The motion compensating unit 68 generates the predicted picture including the foreground region and the background image, based on the motion vector reconstructed by the motion vector reconstructing unit 66 and the foreground region and the background picture stored in the frame memory 69. The adder 64 adds the inverse-orthogonal converted data from the IDCT unit 63 to the predicted picture supplied from the motion compensating unit 68, thereby acquiring the reproduced picture OUT2.

Figure 7:
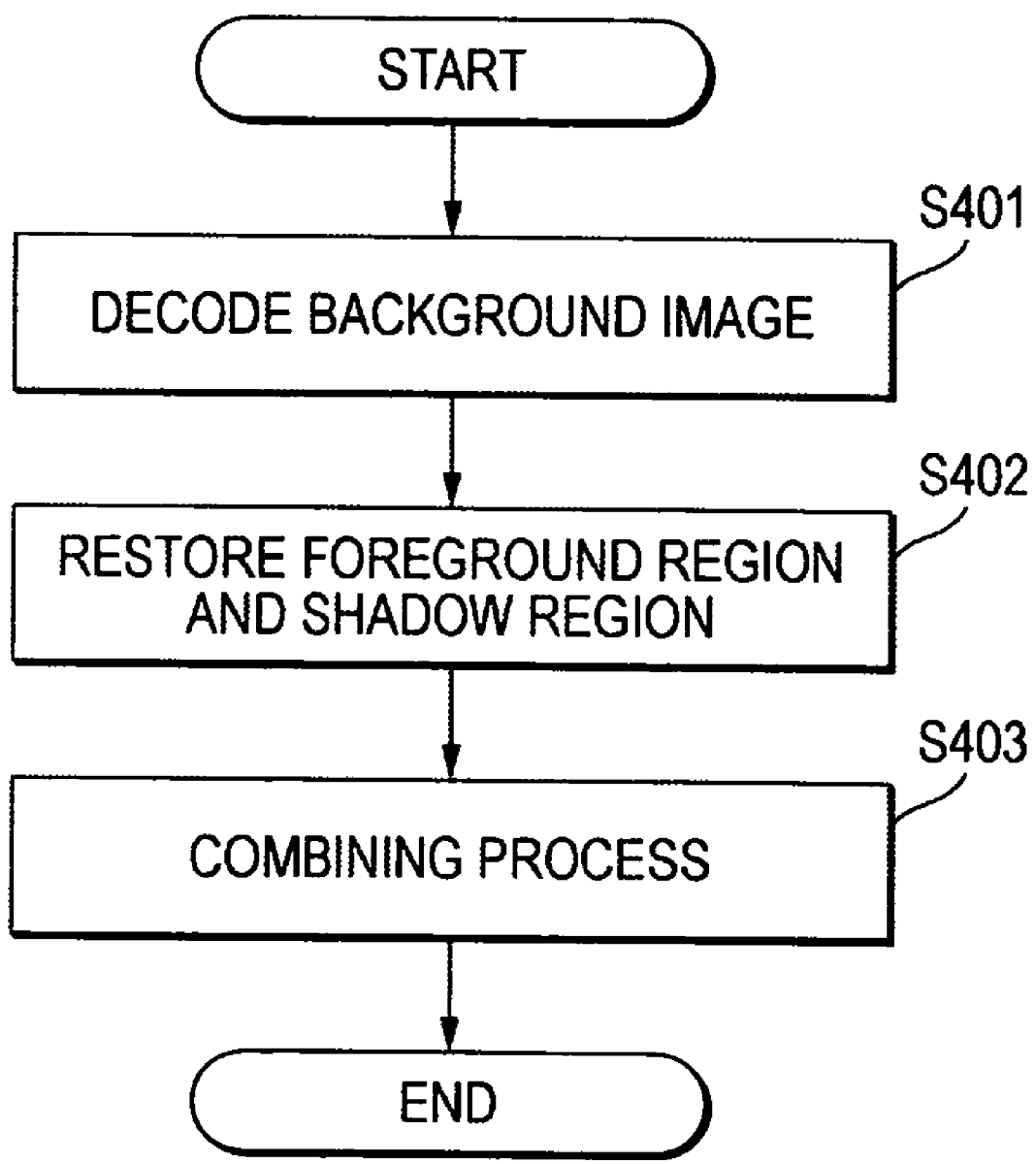
FIG. 7 is a flowchart showing an exemplary operation of the video decoding device according to the second embodiment of the invention.

Now referring to the flowchart shown in FIG. 7, an explanation will be given of an exemplary rough operation of the video decoding device according to the second embodiment of the invention.

In step S401, the variable-length decoding unit 61, inverse-quantizing unit 62 and IDCT unit 63 decode the background image from the coded bit stream IN2 that is intraframe-coded. The decoded background image is stored in the frame memory 69.

In step S402, the restoring unit 65 restores the shadow region and the shape of the foreground region, and the motion compensating unit 68 restores the pattern of the foreground region.

In step S403, the combining unit 67 combines the background image acquired in step S401 and the foreground region and shadow region acquired in step S402.

As described above, in accordance with the video decoding device according to the second embodiment, there can be provided a video decoding device capable of decoding the video coded by the video coding device shown in FIG. 1. Thus, the video decoding device capable of improving the coding efficiency can be provided.

Third Embodiment

Figure 8:
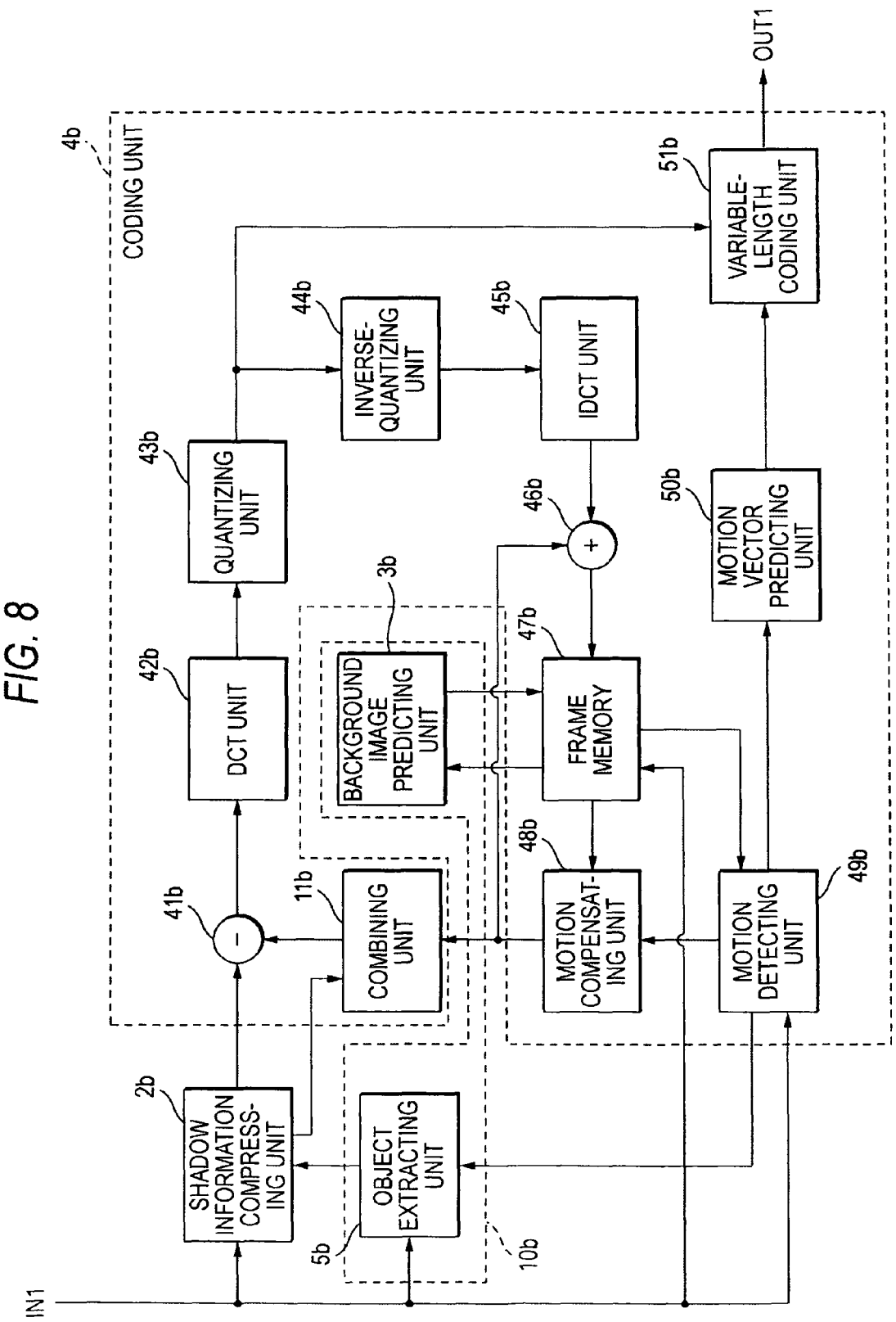
FIG. 8 is a block diagram showing an exemplary arrangement of the video coding device according to the third embodiment of the invention.

In the video coding device according to the third embodiment of the invention, an explanation will be given of a video decoding device relied on the coding system not using the shape coding technique, e.g. MPEG2 or H.264 (MPEG AVC). As shown in FIG. 8, in the video coding device according to the third embodiment, the shadow information compressing unit 2b performs the compression process for the shadow region in the input picture IN1 and supplies the input picture of the shadow region subjected to the compression process to the subtracter 41b. The coding unit 4b does not perform the process for the shape coding. Further, a detecting unit 10b does not have the shape information generating unit 1a as shown in FIG. 1. The remaining arrangement is the same as in the video coding device shown in FIG. 1.

The video coding device shown in FIG. 8 intends to improve the coding efficiency by changing the information on the shadow region. The shadow information compressing unit 2b performs, as the compression process for the shadow region, at least one of (a) canceling the shadow region, (b) changing the color of the shadow region, (c) changing the shape of the shadow region, and (d) changing the updating timing of the shadow region.

(a) "Changing the shadow region" is a process of canceling the shadow region in the input picture IN1. By canceling the shadow region, the increase in the predictive residual due to the shadow region can be avoided.

(b) "Changing the color of the shadow region" is a process of changing the shadow region into a specific color. Since the shadow region has a pattern with luminance lowered from that of the background image, the quantity of generated codes is likely to increase. So, for example, by changing the pattern of the shadow region into black, the compressing rate can be improved.

(c) "Changing the shape of the shadow region" is a process of aligning the boundary of the shadow region with that of the coded block because if the boundary of the shadow region resides in the coded block, the quantity of generated codes is likely to increase. This process can be effectively performed in combination with the process of (b).

(d) "Changing the updating timing of the shadow region" is as follows. If the shadow region is moving relatively to the background image, the predictive residual increases so that the quantity of generated codes is likely to increase. So, by limiting the motion timing of the shadow region relative to the background image to only the intraframe-coded picture, the predictive residual can be greatly reduced thereby to improve the coding efficiency. This process can be also combined with the above process of (b) and process of (c).

Next, referring to the flowchart shown in FIG. 9, an explanation will be given of an exemplary operation of the video coding device according to the third embodiment. Only the operation different from that in the video coding device according to the first embodiment will be explained, and the overlaps of the explanation will be avoided.

Figure 9:
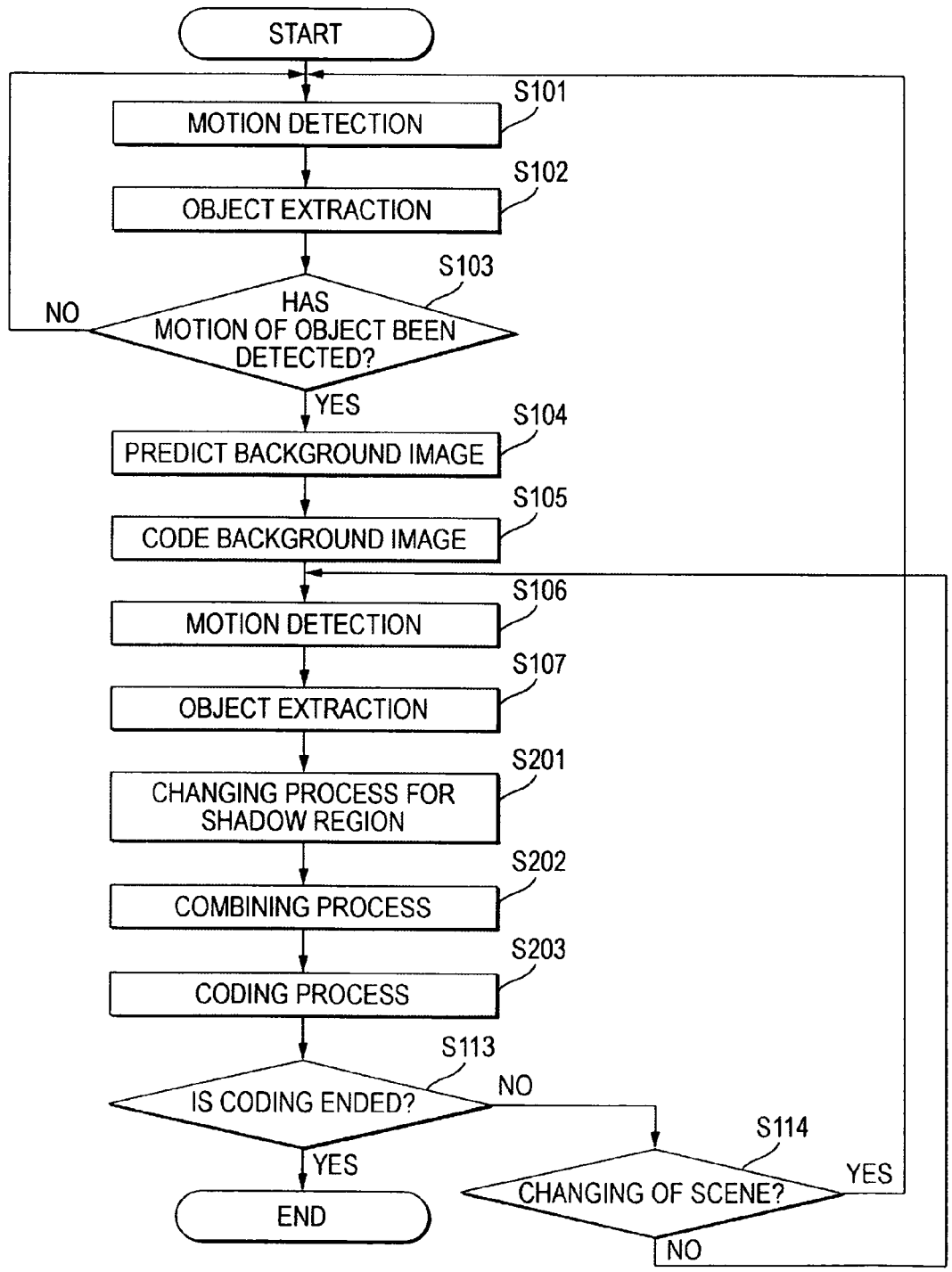
FIG. 9 is a flowchart showing an exemplary operation of the video coding device according to the third embodiment of the invention.

In step S201 in FIG. 9, the shadow information compressing unit 2b performs, as the compression process, at least one of the above processes (a) to (d).

In step S202, the combining unit lib combines the information on the background image acquired in step S104, the information on the foreground region acquired in step S107 and the information on the shadow region subjected to the compressing process in step S201. The picture acquired by the combining process is supplied as the predicted picture to the subtracter 41b. In the subtracter 41b, its difference (predictive residual) from the input picture IN1 containing the shadow region subjected to the compression process is computed.

In step S203, the coding unit 4b codes the predicted picture computed in step S202. As a result, the coded bit stream OUT1 is generated.

As described above, in accordance with the video coding device according to the third embodiment, in the coding system not corresponding to the shape coding technique, the coding efficiency can be improved. Incidentally, the coded bit stream generated by the video coding device shown in FIG. 8 can be decoded by a general video coding device.

Other Embodiments

Hitherto, the invention has been described with reference to the first to third embodiments, but it should not be understood that the description and drawings constituting a part of the disclosure limits the invention. From this disclosure, various substitutive embodiments, concrete examples and applying techniques become apparent for those skilled in the art.

In the embodiments described above, it has been premised that the shadow region is a region with luminance lowered from that of the background image. However, where the shadow region is only black, since an increase in the predictive residual due to the shadow region is not generated, general coding and decoding processes may be performed.

The explanation was given of the case where there is a single set of the foreground region and the shadow region. However, the invention can be also applied to the input picture IN1 in which there are plural sets of the foreground region and the shadow region.

Further, various kinds of video coding/decoding process procedure described above may be loaded in a computer and performed by the computer. Further, the video coding device shown in FIGS. 1 and 8 and the video decoding device shown in FIG. 6 may be monolithically integrated on a single semiconductor chip, respectively to constitute a semiconductor integrated circuit.

As described above, it should be understood that the invention includes various embodiments not disclosed in the specification. Therefore, the invention is limited by only the inventive item in the proper scope of claims, detected from the disclosure.

What is claimed is:

1. A video coding device comprising:
a detecting unit configured to detect a foreground region, a background image and a shadow region reflected on the background image by the foreground region in an input picture, the detecting unit includes a shape information generating unit configured to generate shape information of the foreground region;
a shadow information compressing unit configured to perform a compression process to compress the information quantity of the shadow region, the shadow information compressing unit includes a specifying unit configured to specify a relative positional relationship between the foreground region and the shadow region, and a computing unit configured to obtain luminance variation information indicating a luminance variation of the shadow region relative to the background image; and
a coding unit configured to code the foreground region, the background image and the information on the shadow region subjected to the compression process, the coding unit codes the shape information, information of the relative positional relationship and the luminance variation information.

2. The video encoding device according to claim 1, wherein the specifying unit performs a matching process between the shape information of the foreground region and the shape information of the shadow region to obtain the information of the relative positional relationship.

3. The video encoding device according to claim 2, wherein the specifying unit performs a modification process to modify one of the shape information of the foreground region and the shape information of the shadow region when the degree of similarity at the matching process is a predetermined degree and below, and performs a second matching process using the modified shape information.

4. The video encoding device according to claim 3, wherein the modification process includes at least one of magnifying, reducing and rotating of the shape information.

5. The video encoding device according to claim 1, wherein a computing unit computes a decreasing rate of the luminance of the shadow region relative to the background image as the luminance variation information.

6. A video coding device comprising:
a detecting unit configured to detect a foreground region, a background image and a shadow region reflected on the background image by the foreground region in an input picture, and the detecting unit extracts an object using a motion detection, and tracks the extracted object to determine the forgoing region and the shadow region based on the change of a luminance and a chrominance of the object;
a shadow information compressing unit configured to perform a compression process to compress the information quantity of the shadow region; and
a coding unit configured to code the foreground region, the background image and the information on the shadow region subjected to the compression process.

7. The video coding device according to claim 1, wherein the shadow information compressing unit performs, as the compression process, at least one of canceling the shadow region, changing the color of the shadow region, changing the shape of the shadow region, and changing the updating timing of the shadow region.

8. A video decoding device comprising:
a decoding unit configured to receive a coded bit stream including a picture containing a foreground region, a background image and a shadow region reflected on the background image by the foreground region, and to decode the background image, shape information of the foreground region, information of the relative positional relationship between the foreground region and the shadow region, and luminance variation information indicating a luminance of luminance variation of the shadow region relative to the background image; and
a restoring unit configured to restore shape information of the shadow region from the shape information of the foreground region and the information of the relative positional relationship, and restore pattern information of the shadow region from the background image and the luminance variation information.

9. The video decoding device according to claim 8, further comprising a combining unit configured to combine the foreground region, the background region and the shadow region restored by the restoring unit.

10. The video decoding device according to claim 8, wherein the luminance variation information includes a decreasing rate of the luminance of the shadow region relative to the background image.

11. The video decoding device according to claim 8, wherein information of the relative positional relationship includes the information on a modification of one of the shape information of the foreground region and the shape information of the shadow region.

12. A video coding method comprising:
detecting a foreground region, a background image and a shadow region reflected on the background image by the foreground region in an input picture, said detecting the foreground region comprises generating shape information of the foreground region;
performing compression process to compress the information quantity of the shadow region, said performing the compression process includes specifying a relative positional relationship between the foreground region and the shadow region, and obtaining luminance variation information indicating a luminance variation of the shadow region relative to the background image; and
coding the foreground region, the background image and the information of the shadow region on the shadow region subjected to the compression process, said coding the foreground region and the information on the shadow region includes coding the shape information, information of the relative positional relationship and the luminance variation information.

13. The video encoding method according to claim 12, wherein said specifying the relative positional relationship comprises performing a matching process between the shape information of the foreground region and the shape information of the shadow region.

14. The video encoding method according to claim 13, wherein said specifying the relative positional relationship comprises performing a modification process to modify one of the shape information of the foreground region and the shape information of the shadow region when the degree of similarity at the matching process is a predetermined degree and below, and performing a second matching process using the modified shape information.

15. The video encoding method according to claim 14, wherein the modification process includes at least one of magnifying, reducing and rotating of the shape information.

16. The video encoding method according to claim 12, wherein said obtaining the luminance variation information comprises computing a decreasing rate of the luminance of the shadow region relative to the background image.

17. A video coding method comprising:
    detecting a foreground region, a background image and a shadow region reflected on the background image by the foreground region in an input picture, and said detecting the foreground region and the shadow region includes extracting an object using a motion detection, and tracking the extracted object to determine the forgoing region and the shadow region based on the change of a luminance and a chrominance of the object;
    performing compression process to compress the information quantity of the shadow region; and
    coding the foreground region, the background image and the information of the shadow region on the shadow region subjected to the compression process.

18. The video coding method according to claim 12, wherein the compression process includes at least one of canceling the shadow region, changing the color of the shadow region, changing the shape of the shadow region, and changing the updating timing of the shadow region.

* * * * *